(No Model.)

H. R. BLAIR & J. B. GIFFEN.
COMPUTING SCALE.

No. 510,319. Patented Dec. 5, 1893.

Witnesses

Inventors
H R Blair
J B Giffen
John Wedderburn
Attorney

UNITED STATES PATENT OFFICE.

HARRY R. BLAIR AND JAMES B. GIFFEN, OF SACRAMENTO, CALIFORNIA.

COMPUTING-SCALE.

SPECIFICATION forming part of Letters Patent No. 510,319, dated December 5, 1893.

Application filed April 7, 1893. Serial No. 469,375. (No model.)

*To all whom it may concern:*

Be it known that we, HARRY R. BLAIR and JAMES B. GIFFEN, of Sacramento, in the county of Sacramento and State of California, have invented certain new and useful Improvements in a Combined Weighing and Calculating Device; and we do hereby declare the following to be a full, clear, and exact description of the invention, such as will enable others skilled in the art to which it appertains to make and use the same.

This invention relates to an improved combined weighing and calculating device, which is particularly adapted for spring scales.

The object of our invention is to provide a simple device which will indicate the total cost of the weighed article, when its price is fixed at so much per pound, the device not only indicating the number of pounds the article weighs, but also the amount that such weight aggregates.

Our invention could also be used upon other devices for multiplying.

Our invention consists of the parts and combination of parts hereinafter described and claimed.

Figure 1:
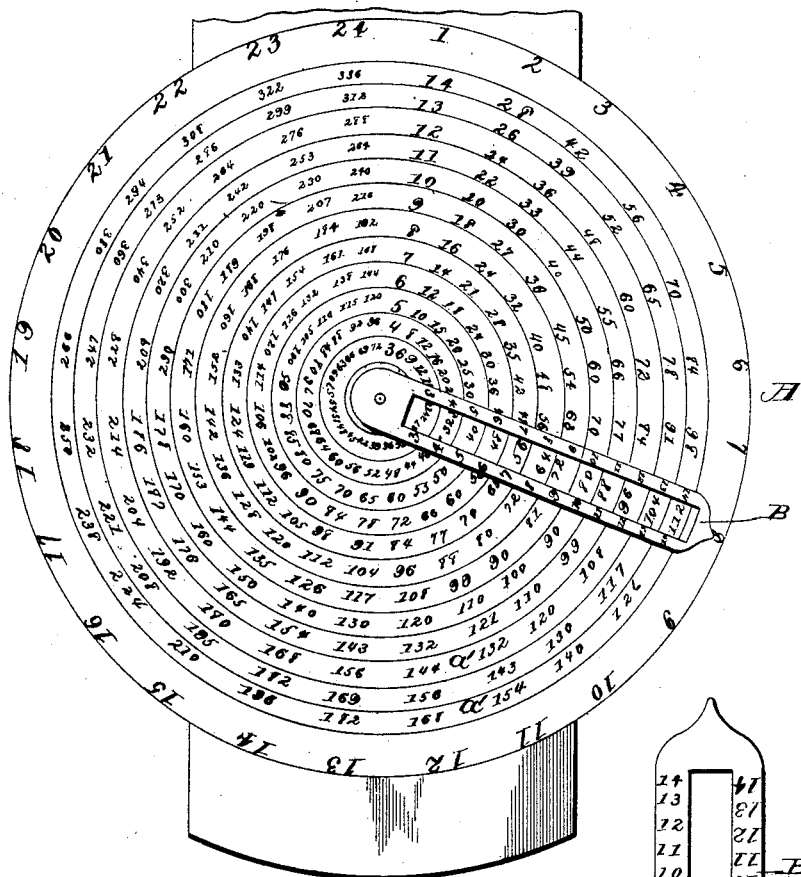
Figure 2:
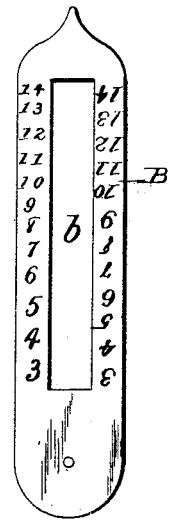

In the drawings forming a part of this specification, Figure 1, is a face view of our improved device as applied to a spring scale, and Fig. 2, is a detail view of the pointer.

In carrying out our invention, we employ a dial or plate A, circular in shape, and upon its face mark the numerals 1, 2, 3, &c., in circular order, said numerals indicating the points to which the pointer B, will move when a weight of one pound, two pounds, three pounds, &c., is placed in the scale.

Radially opposite each numeral of the circle is marked a row of numerals arranged in arithmetical progression, as clearly shown, the numbers growing larger as they approach the circumference of the dial or plate. These numbers, besides being arranged in separate radial rows, are also arranged in definite concentric circles $a'$. The pointer is pivoted at the center of the dial or plate A, and is free to move entirely around. This pointer is slotted longitudinally as shown at $b$, and upon each side of the slot are marked the numerals from 3 to 14, inclusive, each separate numeral aligning with a particular concentric circle of numerals as clearly shown.

The numerals on the pointer on opposite sides of the slot therein are arranged in reverse positions so that they can be easily read when the said pointer is in a plane below the center of the disk or in a plane above the same.

In operation we will suppose that an article has been sold whose price is thirteen cents per pound, and when this article is placed upon the scales to be weighed, the pointer springs around until it reaches the figure 8, thus indicating that the article weighs eight pounds, and by glancing at the number 13, upon the side of the pointer, the figure 104 will be seen within the slot directly opposite the number 13, thus indicating that an article weighing eight pounds, whose price is thirteen cents a pound, will amount to one hundred and four cents, or one dollar and four cents. In this manner any article can be weighed, and the cost of the same at once determined without the trouble of an arithmetical operation.

Having thus described our invention, what we claim is—

In a combined weighing and calculating device, the combination of a dial having circumferentially arranged weight numerals and radially positioned cost numerals extending from the center toward the circumference of said dial in arithmetical progression and in concentric circular rows, and a hand or pointer pivoted at its inner end and formed with a longitudinal slot upon opposite sides of which are a series of numerals designating price of individual pounds and registering with the concentric rows aforesaid the said numerals on the hand or pointer being reversely arranged so as to be easily read either in a position below the plane of the center of the disk, or in a plane above the latter, substantially as described.

In testimony whereof we have signed this specification in the presence of two subscribing witnesses.

HARRY R. BLAIR.
JAMES B. GIFFEN.

Witnesses:
J. C. CARLY,
LYDIA C. BALDWIN.